United States Patent Office 3,355,579
Patented Nov. 28, 1967

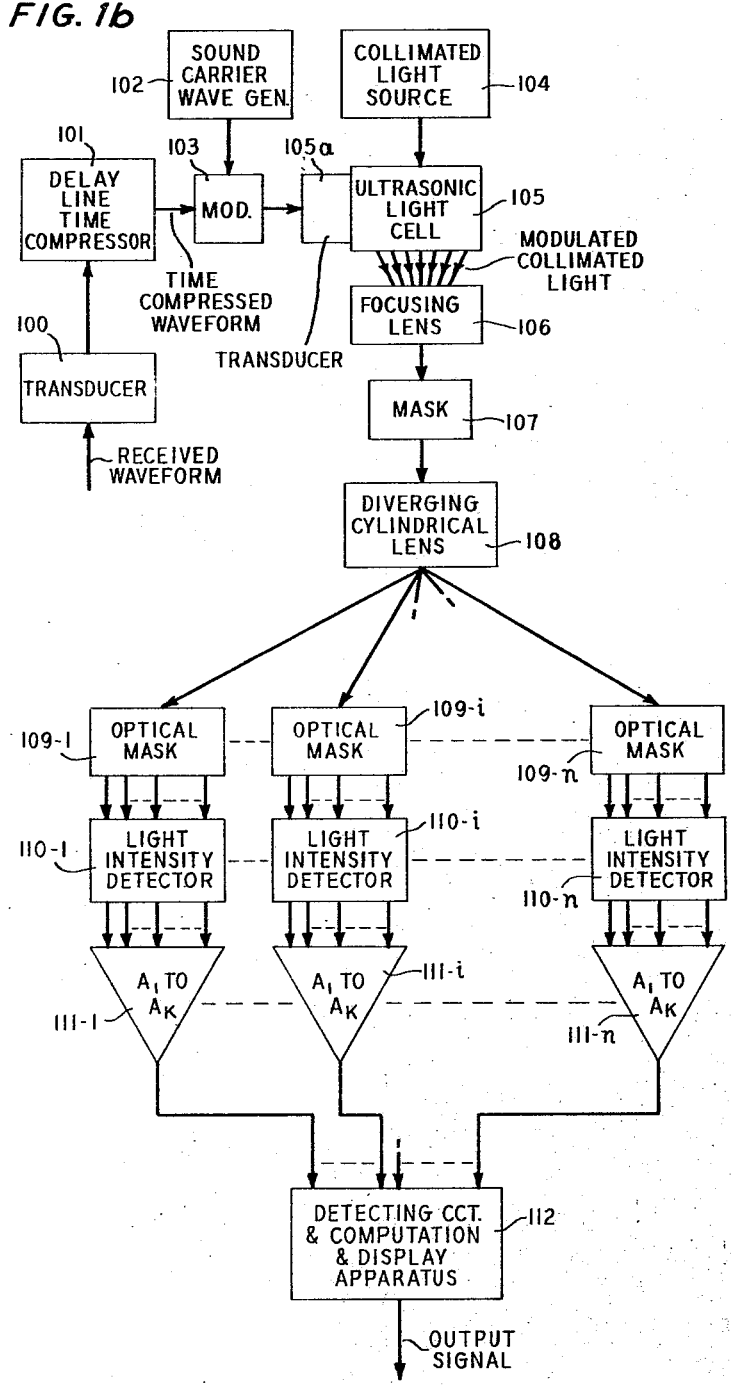

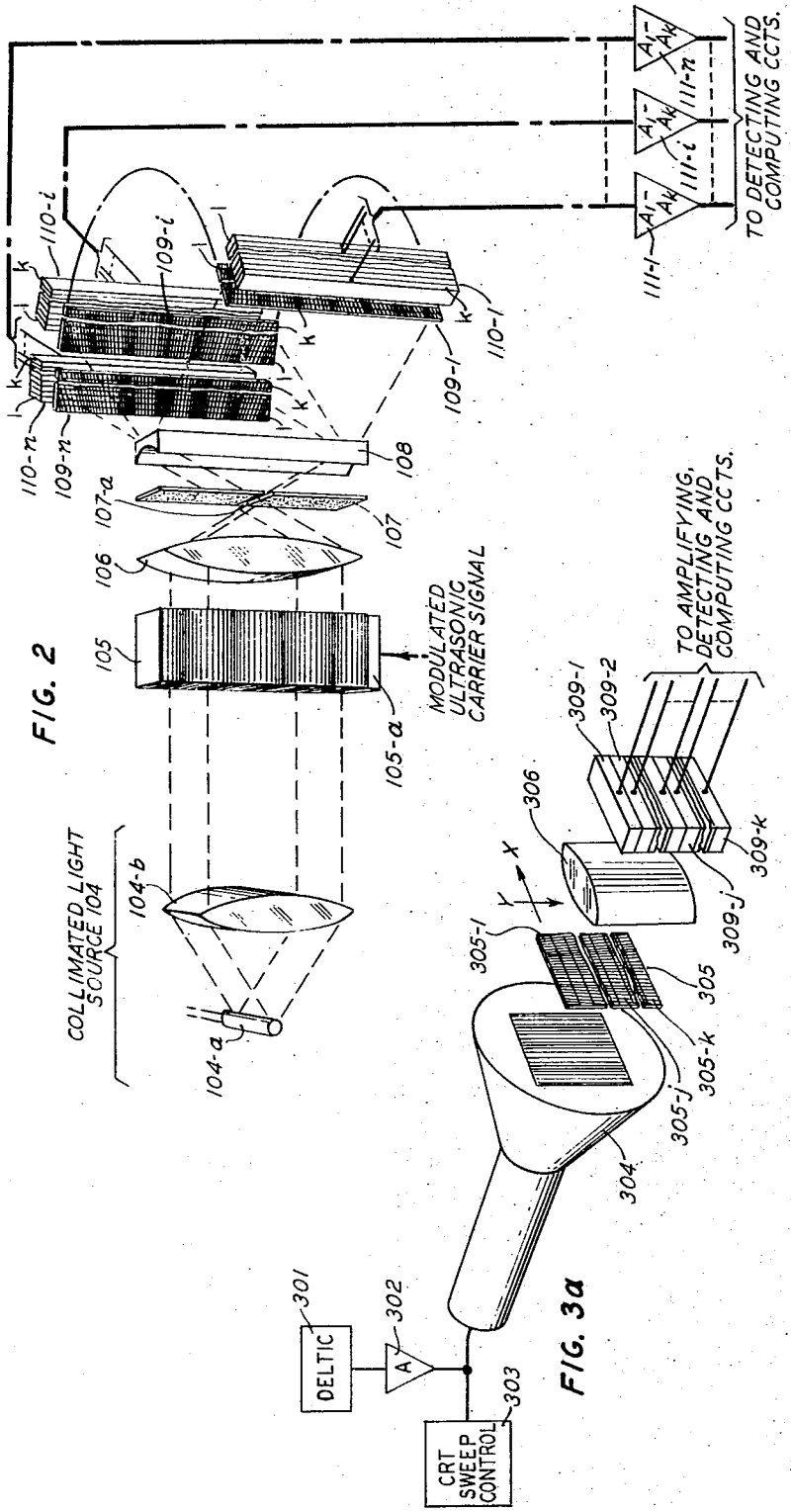

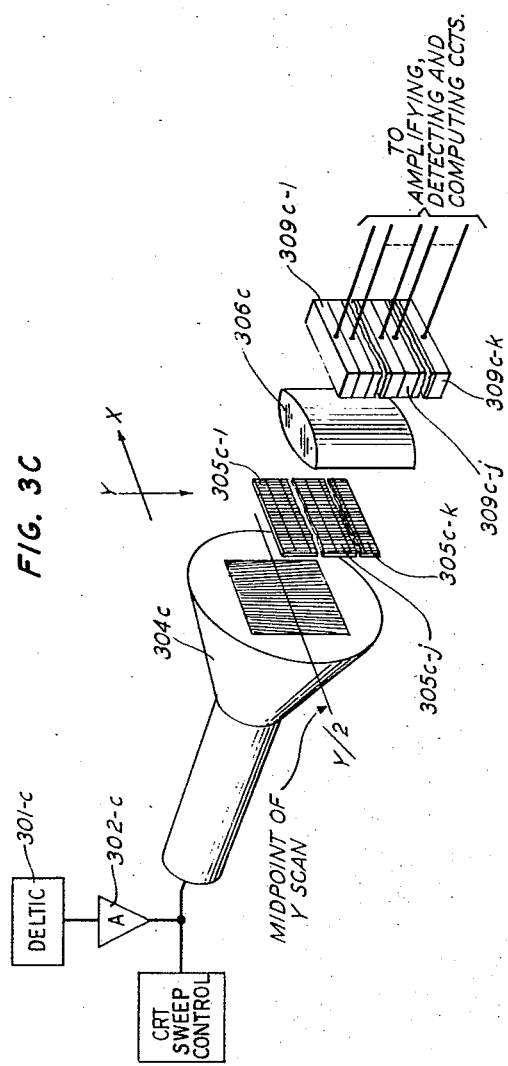

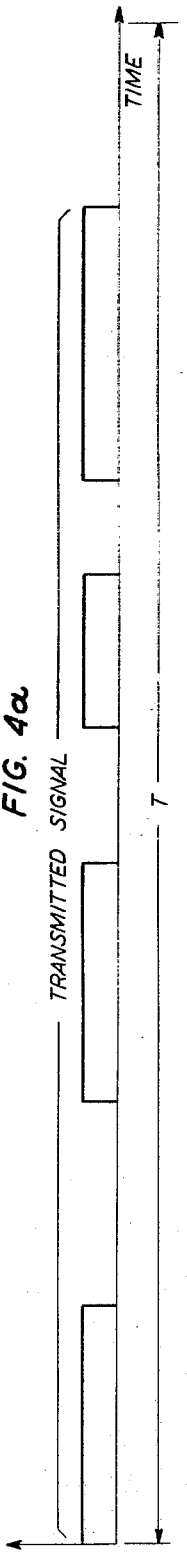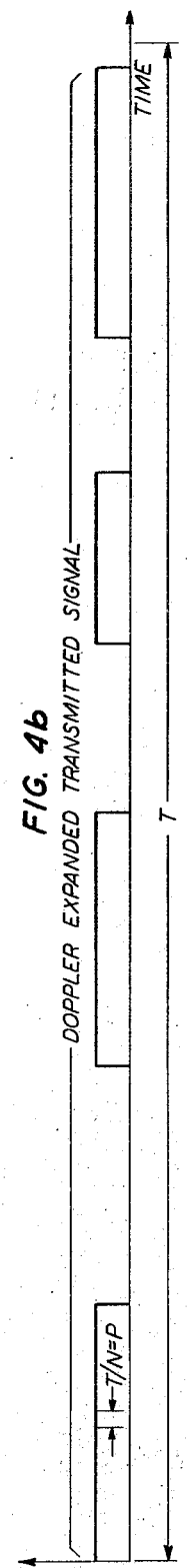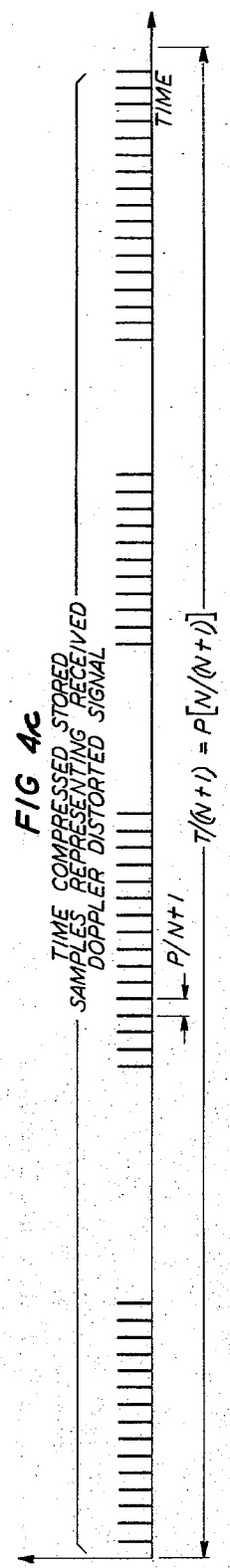

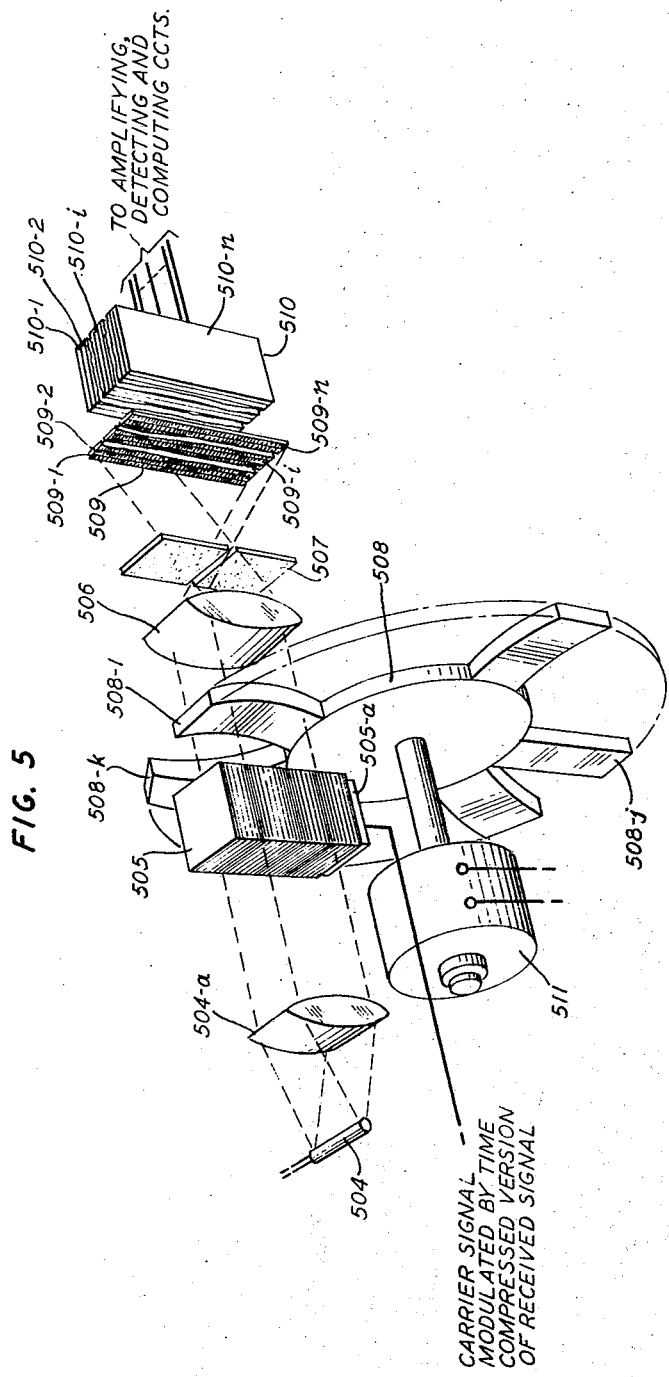

3,355,579
CORRELATION APPARATUS
George H. Robertson, Summit, N.J., assignor to Bell Telephone Laboratories, Incorporated, New York, N.Y., a corporation of New York
Filed Oct. 20, 1965, Ser. No. 498,709
10 Claims. (Cl. 235—181)

ABSTRACT OF THE DISCLOSURE

The receipt of a particular Doppler distorted version of one of several possible signals is detected by converting the received signal into an optical signal, and then noting the region of one of a plurality of variable transmissivity masks which passes maximum optical signal energy.

---

This invention relates to the determination of the Doppler shift of a transmitted signal. In particular, this invention relates to the use of optical techniques to determine the Doppler shift of a transmitted acoustic or electromagnetic signal.

In any communication situation, regardless of whether the type of signal used is acoustic or electromagnetic, relative motion between the signal source and the receiver causes a shift in the frequencies of the transmitted signal and thus increases the difficulty of recognizing the transmitted signal at the receiver. This shift is known as the "Doppler shift" and its magnitude is directly proportional to the relative velocity between the source and the receiver. If the source and receiver are approaching the Doppler shift increases the frequencies of the transmitted signal as received at the receiver, while if the source and receiver are moving apart, the Doppler shift decreases the frequencies of the transmitted signal as received at the receiver.

The Doppler shift of a transmitted signal also makes signal recognition more difficult in systems such as sonar or radar systems designed to determine the presence of objects by detecting the reflection of acoustic or electromagnetic signals from the objects. In these systems, the Doppler shift is usually caused by relative motion between the signal source, receiver and reflecting object. In addition, motion of or disturbances in the transmission medium can also cause a frequency shift in the transmitted signal which resembles the Doppler shift.

In any communication, sonar or rader system, a large number of different signals can be transmitted, and each of these signals can be Doppler distorted or obscured by background noise. Thus, usually the reception of a transmitted signal requires the detection, in the presence of background noise, of one particular Doppler shifted signal from the total population of Doppler shifted signals. One well known technique of detecting the receipt of a transmitted signal under such conditions is by correlating the received signal, composed in general of the Doppler shifted transmitted signal and background noise, with stored replicas of a large number of Doppler distorted versions of each possible transmitted signal. The correlation process involves multiplying each replica with the stored but continuously updated received signal to obtain what is defined as a correlation product. This product, when normalized, usually fluctuates about some nominal value. However, at the instant in time when the stored received signal includes a transmitted signal which correlates with one of the replicas, the normalized correlation product assumes a clearly distinguishable maximum value thus indicating the receipt of a transmitted signal. When this occurs the reference signal is said to correlate with the received signal. The particular signal transmitted and the Doppler distortion of this signal are determined from the reference signal for which the correlation function is a maximum. The development and use of correlation theory to determine the time of receipt of a transmitted signal is outlined in Woodward, "Probability and Information Theory, With Application to Radar," pages 62–125.

Techniques for correlating a received signal with a reference signal are well known. See, for example, a paper by J. L. Stewart and W. V. Allen entitled "Pseudonoise-Correlation Techniques in Underwater Acoustic Studies," published in the Proceedings of the Fourth International Congress on Acoustics, Copenhagen, August 1962.

One technique for obtaining the correlation function of two signals is to use a delay line time compressor or "deltic" disclosed by V. C. Anderson in Patent 2,958,039, issued Oct. 25, 1960. A typical deltic contains two recirculating delay lines. The first delay line contains a time compressed but continuously updated version of the received signal while the second delay line contains a reference signal which is merely a time compressed version of the transmitted signal. By multiplying, in a specified manner once each deltic sampling period, the information stored in the first recirculating delay line with the reference signal stored in the second recirculating delay line and summing the products so obtained, the samples from the received signal can be correlated with the samples of the reference signal. The time at which the correlation function is a maximum gives the time of arrival of the transmitted signal at the receiver. If the received signal has been Doppler shifted, then a multiplicity of reference signals, each stored in a separate recirculating delay line, and each altered to match one particular Doppler condition are required. The number of reference channels required depends on the Doppler resolution desired.

A second method of performing the correlation process on the received Doppler shifted signal involves the use of a plurality of matched filters arranged in parallel. Such a system, designed for application to radar systems, is described in the June 1960 IRE Transactions on Information Theory, page 373, in an article by R. M. Lerner entitled "A Matched Filter Detection System for Complicated Doppler Shifted Signals."

A matched filter is a filter designed to yield a maximum output signal when the input signal to the filter is of a specified form; that is, when the filter is "matched" to the input signal. By placing a series of matched filters in parallel, where each filter is designed to match one Doppler-shifted version of one transmitted signal, the received signal can be correlated with at least as many reference signals as there are matched filters. The matched filter which produces the maximum output signal yields both the most probable transmitted signal and the most probable Doppler shift undergone by this signal. The time at which the output of this particular matched filter reaches a maximum relative to the transmission time of the received signal is proportional to the distance traveled by the transmitted signal.

A third method of correlating a received signal with the transmitted signal is by use of an optical correlation system as disclosed by A. H. Rosenthal in Patent 3,088,-113, issued Apr. 30, 1963. Rosenthal's system correlates the radar signal reflected from a moving object with the signal originally transmitted. To determine the reception time of the reflected signal Rosenthal utilizes an optical mask with a transmissivity proportional to some selected characteristic of the transmitted signal. The transmissivity at any point of an object is that fraction of the incident electromagnetic energy, visible or otherwise, which is passed through the object. The transmissivity of an object is in general a function of such variables as the wavelength and angle of incidence of the electromagnetic energy and the index of refraction and dielectric constant of the object.

The received signal is transmitted through an ultrasonic light cell in the form of a compression wave. This compression wave modulates light passing through both the cell and the mask. As the traveling image of the compression wave in the cell crosses the fixed mask in the form of intensity variations of the modulated light, all possible phase relationships are obtained between the waveform of the received signal, represented by the modulated light, and the transmitted signal, represented by the transmissivity function of the mask. An integrator, containing a photoelectric cell to receive from a focusing lens the light rays transmitted by the mask, has a maximum output when the received signal correlates with the transmissivity of the mask. The time at which this correlation is obtained relative to the transmission time of the received signal is a measure of the travel time of the received signal and thus of the distance of the reflecting object from the transmitter. Thus Rosenthal's apparatus is designed to detect the time of receipt of an undistorted reflected signal with known waveshape, but it is not capable of detecting the time of receipt of a Doppler distorted version of any one signal from a large population of signals.

This invention, on the other hand, solves this problem by providing optical correlation apparatus capable of detecting the time of receipt of one signal from a large population of signals even though the received signal has been subjected to severe Doppler distortion. This system converts the received signal into an optical signal and then optically correlates the energy pattern of the optical signal either simultaneously or sequentially with a series of reference signals. Each reference signal is carefully selected to correlate with one signal from the expected population of Doppler distorted signals which might be received. The apparatus locates the reference signal which produces the maximum correlation signal when correlated with the received but Doppler distorted signal and this reference signal is the most probably transmitted signal. The Doppler shift associated with this reference signal is the Doppler shift of the received signal. The time at which a reference signal correlates with the received signal relative to the transmission time of the received signal is a measure of the distance between the source and the receiver or the reflecting object and the receiver. The number of reference signals associated with each transmitted signal determines the accuracy with which the Doppler shift of the received signal can be determined and thus determines the accuracy with which the relative velocity between the source and receiver, or between the reflecting object and receiver can be determined.

In one embodiment of this invention, the received signal is continuously time compressed and this time compressed version of the signal is then transmitted through an ultrasonic light cell in the form of a compression wave. Collimated light waves are passed through the ultrasonic light cell approximately perpendicular to the direction of travel of the compression wave. The collimated light is modulated by the compression and expansion of the material in the ultrasonic light cell in response to the compression wave. The resulting modulated and thus diffracted light is then passed through a system which separates the first through $n^{th}$ order diffracted light from the zero order diffracted light, also called the undiffracted light. Since the undiffracted light has the highest intensity relative to all orders of diffracted light it is desirable to utilize the undiffracted light to detect the receipt of the transmitted signal. In order to detect the receipt of the transmitted signal, the undiffracted light is separated or spread into a multiplicity of paths, and the light in each path is transmitted through a mask with a plurality of contiguous transmission areas. Each transmission area has a transmissivity as a function of some selected dimension, usually length, designed to correlate with the undiffracted light pattern caused by the receipt of one particular transmitted signal subjected to one particular Doppler distortion.

The undiffracted light pattern is proportional at each instant of time to the latest T seconds of the received signal where T is at least equal to the length of the transmitted signal. Since the transmissivity of each transmission area of each mask is designed to correlate with one Doppler distorted version of one transmitted signal, the total undiffracted light passing through each area of each mask is proportional to the time integral over T seconds of the product of the latest T seconds of the received signal and one Doppler distorted version of one transmitted signal. Thus the total light passing through each area of each mask is proportional to a time-limited correlation product and can be used to detect the time of receipt of a Doppler distorted signal. This is done in the following manner.

The total light transmitted through each mask is integrated continuously as a function of time by a plurality of light sensitive elements arranged in parallel. Each light sensitive element matches one of the plurality of contiguous mask transmission areas. The output signal of the light sensitive element corresponding to that one area of the one mask which best correlates with the Doppler shifted received signal will be a maximum at the instant the transmitted signal is in the ultrasonic light cell. This maximum output signal can be detected in an appropriate detection circuit and the most probably transmitted signal together with its Doppler shift can be determined.

A second embodiment of the principles of this invention passes the diffracted light from the ultrasonic light cell sequentially through each of a series of lenses mounted on a rotating disk. The disk is actuated by a drive motor and each lens either contracts or expands the modulated light from the light cell, to compensate for a corresponding amount of Doppler distortion assumed to be present in the received signal. The diffracted light which passes through the lens is passed through a first mask which removes all but the zero order diffracted light, and the zero order diffracted light then is passed through a second mask divided into a plurality of contiguous vertical or longitudinal areas. Each area possesses a transmissivity as a function of length designed to correlate with one particular transmitted signal. A plurality of light sensitive elements corresponds on a one-to-one basis with the plurality of longitudinal sections of the mask. The particular light sensitive element which emits a maximum signal indicates the most probably transmitted signal, while the particular lens through which the light passes at the time a maximum signal is obtained indicates the most probable amount of Doppler distortion of the transmitted signal.

In still another embodiment of this invention, the received signal is used to modulate the intensity of the scanning beam of a cathode ray tube. The scanning beam sweeps the face of the cathode ray tube in one selected direction at a predetermined speed and is displaced slightly in the second direction for each sweep. The resulting pattern on the face of the tube resembles dark and light columns of different widths, the total pattern being proportional to the amplitude or polarity of the received signal over a given time period T. A plurality of masks, each with a transmissivity as a function of a selected dimension designed to correlate with a different Doppler distorted version of one waveform, is placed side by side in front of the cathode ray tube. The mask which passes maximum light is detected by a corresponding light intensity detector. This light intensity detector's output signal is proportional to the correlation between the cathode ray tube's light pattern and the transmissivity of the mask. The time at which the correlation function is a maximum is measured in a threshold detecting and computation circuit. By placing a plurality of cathode ray tubes in parallel, a plurality of transmitted signals can be distinguished from each other upon receipt despite Doppler distortion.

The invention will be fully apprehended from the following description of illustrative embodiments thereof, taken in conjunction with the appended drawings, in which:

FIG. 1b is a schematic diagram of an optical correlation system illustrating certain details of the system shown in FIG. 1a;

FIG. 2 is a perspective view of the optical portion of the correlation system shown in FIG. 1a;

FIG. 3a is a three dimensional drawing of an embodiment of this invention utilizing one cathode ray tube;

FIG. 3c is a three dimensional drawing of an embodiment of this invention utilizing a cathode ray tube with a variable width scan;

FIG. 4a is a diagram of one hypothetical transmitted signal;

FIG. 4b is a diagram showing one hypothetical Doppler distorted version of the transmitted signal shown in FIG. 4a;

FIG. 4c is a diagram showing on an expanded time scale the stored, time-compressed sequence of N samples of the Doppler distorted signal shown in FIG. 4b;

FIG. 5 is a three dimensional drawing of an embodiment of this invention utilizing a plurality of lenses mounted on a rotatable disk.

Figure 1A:
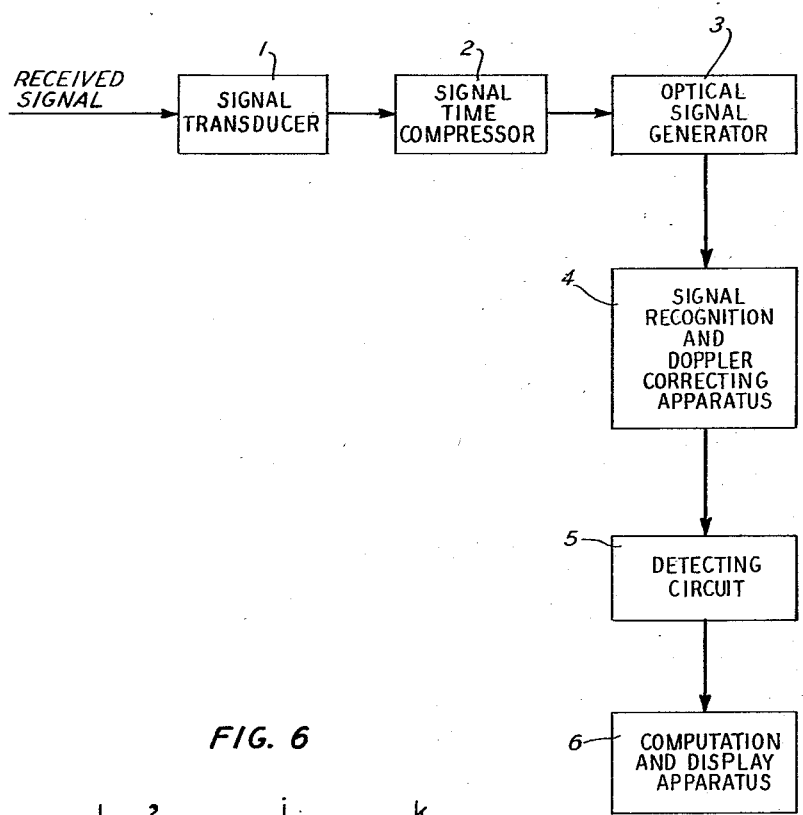
FIG. 1a is a schematic block diagram illustrating in outline a correlation system utilizing the principles of this invention.

Turning first to FIG. 1a, there is shown a block diagram of a general optical correlation system utilizing the principles of this invention. The received signal is converted into an electrical signal by the signal transducer 1, which may be of any well known design, and from transducer 1 the electrical signal is sent to signal time compressor 2 where it is compressed and stored. Compressor 2 may be a delay line time compressor of the type described in U.S. Patent 2,958,039, issued Oct. 25, 1960 to V. C. Anderson. The stored time-compressed version of the received signal is delivered to optical signal generator 3 where it is converted continuously to an optical signal at the output terminal of optical signal generator 3. The optical signal's energy is transmitted optically to the signal recognition and Doppler correcting apparatus 4, the various embodiments of which will be described below. From the recognition and correcting apparatus 4 there is obtained a signal indicating the receipt of a transmitted signal. This signal is sent to the detecting circuit 5 which, when a transmitted signal is received, activates the computation and display means 6 which, in turn, determines the characteristics of the received signal and its time of receipt.

The signal recognition and Doppler correcting apparatus 4 shown in FIG. 1a contains the correlation apparatus necessary to determine the receipt of the transmitted signal. The operation of this apparatus is based on the correlation function $\varphi(\tau)$, which is defined as follows:

$$\varphi(\tau) = \lim_{T \to \infty} \frac{1}{2T} \int_{-T}^{T} g_i(t) f(t+\tau) dt \quad (1)$$

For the purposes of this specification $g_i(t)$ is defined as a reference signal stored at the receiver, and $f(t+\tau)$ is defined as the received but Doppler distorted signal. The index $i$ is a positive integer which can assume as many values as there are reference signals. Since $g_i(t)$ is a replica of a transmitted signal and since $f(t+\tau)$ includes a time displaced version of the transmitted signal Equation 1 reaches a clearly defined maximum value when the transmitted signal is received; that is $\varphi(\tau)$ is a maximum when $g_i(t) = f(t+\tau)$.

Equation 1 defines the correlation function $\varphi(\tau)$ as the time integral of the product of the reference signal and the received signal over an infinite time period. In practice, of course, it is impossible to obtain the integral of a real time function over an infinite time period. For the purposes of this invention the value of the integral defined in Equation 1 is sufficiently accurate if the integration is carried out over a time period equal to or greater than the duration T of the transmitted signal. If the received and reference signals are stored in such a manner that any part of either signal can be made available for mathematical operations at any time, then it is possible to carry out the integration defined in Equation 1 almost instantaneously in real time. Thus a continuously varying value of the integral in Equation 1 can be obtained over the last T seconds of the received signal provided storage means are available to store both the last T seconds of the received signal and the complete length T of the reference signal. The received signal must, of course, be continuously updated by destroying its oldest parts to make room in the storage device for its new parts.

If, as in this invention, the received signal can include a Doppler distorted version of any one of a number of transmitted signals, a reference signal $g_i(t)$ must be proprovided for each Doppler distorted version of each transmitted signal. While there are, of course, an infinite number of Doppler distorted versions of each transmitted signal, sufficient accuracy can be obtained in recognizing the receipt of a Doppler distorted signal by use of a finite number of reference signals.

In this invention, the integration indicated in Equation 1 is carried out by optical techniques. Each reference signal $g_i(t)$ can be represented by an optical mask possessing variable transmissivity as a function of some selected dimension, such as length. The transmissivity of an object, as defined earlier, is the proportion of incident electromagnetic energy transmitted through the object. The received signal $f(t+\tau)$ can be represented by a modulated beam of collimated light with a width equal to the length of the mask. Such a modulated beam can be obtained by using an ultrasonic light cell. The intensity distribution of the modulated light, in a direction perpendicular to the direction of light propagation and parallel to the length of the mask, represents the amplitude variations of the received signal $f(t+\tau)$, as a function of time. The integral defined in Equation 1 is obtained by collecting in a light intensity detector the total amount of modulated light passed by the optical mask. This total amount of light is proportional to the integral of the product $g_i(t) \times f(t+\tau)$ over the time T. By use of a large number of different optical masks, the integration defined by Equation 1 can be carried out both continuously as a function of time and simultaneously with a large number of reference signals.

Turning now to FIG. 1b, there is shown a schematic diagram of an optical correlation system utilizing the principles of this invention. The received signal is converted to an electrical signal by a transducer 100 which might be, for example, an antenna or a microphone. The electrical signal is sampled in the delay line time compressor 101 at a selected sampling rate determined by the highest frequency component of the received signal. The samples so obtained are stored in a recirculating delay line of the delay line time compressor 101, hereafter referred to as a "deltic." Briefly, the deltic 101 works in the following manner. A received signal, possessing a maximum frequency of $f$ cycles per second, is sampled at a selected frequency $2f$, and each sample is stored in a recirculating delay line. The maximum duration T of the information bearing portion of the received signal is usually known approximately. The total number of samples taken of the received waveform in the time T is just $2fT=N$ and the real time period between samples is $\frac{1}{2}f=P$, measured in seconds. The recirculating period of each sample stored in the recirculating delay line is designed to be just $P-[P/(N+1)]$. Thus, the first sample of the received waveform has recirculated once and is $2\pi/N$ radians or $[P/(N+1)]$ seconds into its second recirculation period when the second sample of the received signal is taken and inserted into the recirculating delay line $[P/(N+1)]$ seconds behind the first sample. This process repeats and the third sample of the received signal is inserted into the recirculating delay line $2[P/(N+1)]$ seconds behind the first sample and $[P/(N+1)]$ seconds behind the second sample. The $n^{th}$ sample of the received signal is inserted into the recirculating delay line $(N-1)[P/(N+1)]$ seconds behind the first sample or, equivalently, $[P/(N+1)]$ seconds ahead of the first sample. The $(N+1)^{th}$ sample is inserted into the delay line just as the first sample passes the insertion point. The first, or oldest, sample is destroyed and the recirculating samples are updated by one sampling period P. Each subsequent sample of the real time received signal destroys the oldest sample in the recirculating delay line and updates the information stored in the delay line by the information derived from the latest sample.

The time compressed received signal in the recirculating delay line of element 101 is sent continuously to modulator 103 to modulate a carrier signal generated at a selected frequency in sound carrier wave generator 102. In addition, this time compressed signal is continuously recirculated in the recirculating delay line. The modulated carrier signal is transmitted continuously to ultrasonic light cell 105 where it is converted into a series of compression and rarefaction pressure waves by means of an electrical-mechanical transducer 105a. Transducer 105a might be, for example, a piezoelectric crystal. The selected carrier frequency is chosen to ensure transmission of the compression and rarefaction waves through the light cell and the carrier signal is therefore hereafter referred to as "an ultrasonic carrier signal." The pressure waves generated by transducer 105a travel along the light cell, changing the index of refraction of the material at each point in the light cell in response to the instantaneous pressure at each point. Such ultrasonic light cells are well known and could be similar to the cell described by by G. W. Willard in Patent 2,287,587, issued June 23, 1942.

A typical ultrasonic light cell for use in this invention might be six to ten inches long, and depending on the material from which it is made, might require from 100 to 1000 microseconds for a pressure wave to travel from one end to the other. Since the light cell is driven by the modulated ultrasonic carrier signal, a continuous series of compression and rarefaction zones travel along the ultrasonic light cell at the acoustic velocity of the medium. If the medium in the light cell is water, then the acoustic velocity of small pressure waves through the medium is about 4750 feet per second and the transit time $\tau$ for a pressure pulse through a light cell six inches long is roughly 100 microseconds or $10^{-4}$ seconds. Of course, it is to be understood that this invention is not limited to operation with ultrasonic light cells possessing the above characteristics.

The ultrasonic light cell is, in effect, a storage element allowing the storage of pressure pulses representing many microseconds of an electrical signal. By using the deltic 101 to compress the real time electrical signal generated from the received signal, the ultrasonic light cell can store pressure pulses representing approximately $\tau N$ seconds of real time acoustical waveform. The symbol N will be shown later to be approximately the time compression achieved with the deltic in addition to being the number of samples of the received waveform taken in time T.

Since the samples of the real time electrical signal stored in the deltic's recirculating delay line can be as narrow as 0.1 microsecond or $10^{-7}$ seconds including space between samples, a large number of samples of the real time received signal can be stored in the recirculating delay line of the deltic, particularly if the sampling period P of the real time waveform is quite long. For an example, it will be assumed that the real time waveform is sampled 1000 times per second. The time compression Q achieved with the deltic is the ratio of the sampling period P to the time width $P/N+1$ of the stored sample. Thus, the time compression $Q=N+1 \cong N$ for large N. If $T=10$ seconds and $P=10^{-3}$ seconds, then since $N=T/P$, $N=10^4$ and approximately $10^4$ samples can be stored in the recirculating delay line, or, in other words, the stored waveform can be compressed in time by a factor of approximately $10^4$. Thus, in this example, one (1) second of real time waveform can be stored in the ultrasonic light cell if 100 microseconds is the transit time $\tau$ of a pressure wave through the cell. To place all 10 seconds of the received signal in the light cell, the transit time $\tau$ of a signal through the light cell, or the time compression Q achieved with the deltic, or the product $\tau Q$, must be increased by a factor of ten.

Light from a collimated light source 104 is passed through the ultrasonic light cell 105 in a direction approximately perpendicular to the direction of travel of the pressure pulses through the cell and parallel to the pressure pulses' wavefronts. The refractive index of the material at any point in the ultrasonic light cell is a function of the strength of the pressure pulse at that point and the magnitude of this pressure pulse as a function of time is determined by the strength of the modulated ultrasonic carrier wave at that point. The result of passing a wavefront of collimated light through an ultrasonic light cell is to phase modulate the light's wavefront as a function of the refractive index of the material in the light cell along the length of the light cell. The ultrasonic light cell thus acts as a diffraction grating and the light which passes through the cell is diffracted.

This phenomenon is discussed in "Principles of Optics" by Born and Wolf, Second Revised Edition at page 407 and in Chapter XII. See also an article entitled "Criteria for Normal and Abnormal Ultrasonic Light Diffraction Effect" by G. W. Willard in 21 Journal Acoustical Society of America 101 (1949). In the Willard article it is shown that if the incident light is perpendicular to the direction of travel of the compression waves through the ultrasonic light cell, then the angle of incidence is defined to be zero and the numerous diffraction spectra which result make angles with the undiffracted zero order light given by the relation $$\sin(mB) = m\lambda/\Lambda \quad (2)$$

In Equation (2), ($m$B) is the angle made by the $m^{th}$ order spectrum line with the zero order diffracted light, $m$ is an integer equal to or greater than zero, $\lambda$ is the wavelength of the collimated light in vacuum and $\Lambda$ is the compression wave's ultrasonic carrier frequency wavelength. The intensity $I_m$ of the $m^{th}$ order spectrum is given by the $m^{th}$ order Bessel function as $$I_m = J_m^2(a) \quad (3)$$

where $a$ is the phase retardation of the light produced by passing the light through the compressed material in the light cell. The term $a$ can be written $$a = 2\pi W \Delta \mu / \lambda \quad (4)$$

where W is the width of the compression waves in the ultrasonic light cell, $\Delta \mu$ is the maximum change in the refractive index at a given point for one cycle of the modulated ultrasonic carrier wave, and $\lambda$ is the wavelength of the collimated light in air or vacuum. Thus the angle of each order of diffracted light with the zero order diffracted light, which is also referred to as undiffracted light, is seen from Equation 2 to be independent of the intensity of the compression wave at any point in the ultrasonic light cell. However, the intensity of the light in each diffraction order is seen from Equations 3 and 4 to be proportional to the change in the refractive index $\Delta\mu$ of the light cell's material at a given point and thus to be proportional to the peak-to-peak compression wave intensity difference at that point. This intensity difference changes with time at any point in the light cell 105 in response to the modulated ultrasonic carrier wave, and thus the intensity of each diffraction order likewise changes with time.

The diffracted light wave which is emitted from the ultrasonic light cell 105 is passed through a focusing lens 106 which focuses the undiffracted or zero order light at the center point of a mask 107. The mask 107 is designed to pass only the zero order spectrum of the transmitted light and thus blocks the passage of the diffracted light consisting of the first through the $n^{th}$ orders. It is to be understood though that mask 107 could be designed to pass any other order spectrum rather than the zero order spectrum if this is desired. However, the zero order spectrum is of higher intensity than the higher order spectrums and thus is the preferred spectrum to use. The undiffracted light is then sent to a diverging cylindrical lens 108 which spreads the light into $n$ paths. The light from the cylindrical lens 108 is sent simultaneously to a series of optical masks 109–1 through 109–$n$ located in such a manner that the optical paths from the diverging cylindrical lens 108 to the optical masks 109 are approximately equal.

Each optical mask 109–$i$, where $i$ is an integer such that $1 \leq i \leq n$, is designed so that its transmissivity as a function of length at some point on its width correlates with the light pattern expected from diverging cylindrical lens 108 for a corresponding transmitted signal when the signal has been subjected to a given amount of Doppler distortion. An optical mask meeting this condition may be constructed by placing photographic film in the position of the mask and then rotating this film to some selected angle about a predetermined line in the plane of the mask. If the film is exposed to collimated light from source 104 passing through the light cell at the instant the complete transmitted signal is located in the ultrasonic light cell, the developed positive film will contain light and dark regions linearly increasing in thickness across the width of the film. This film can be divided into $k$ lengthwise regions perpendicular to the film's width and each region $j$ will correlate with one Doppler shifted version of one transmitted signal, where $j$ and $k$ are positive integers and $1 \leq j \leq k$. If desired, masks can be designed on the basis of analytical calculations relating the desired transmissivity of each region $j$ to one distorted version of one signal.

Figure 6:
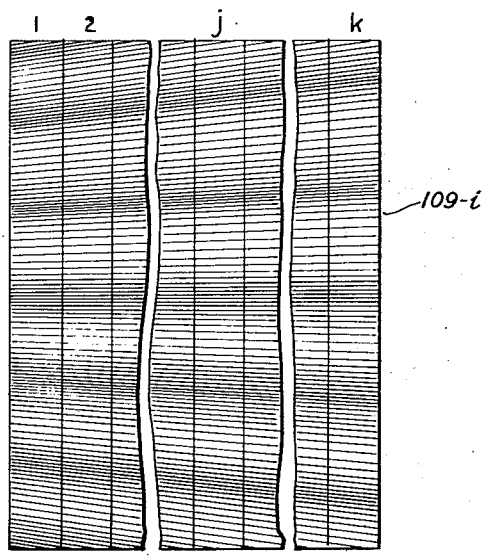
FIG. 6 shows an optical mask with a plurality of contiguous areas possessing variable transmissivity as a function of length, each area being designed to correlate with a different Doppler distorted version of the same transmitted signal.

FIG. 6 shows a typical optical mask obtained by this process. The mask 109–$i$ is divided into $k$ lengthwise regions, each lengthwise region $j$ possessing a transmissivity as a function of length which correlates with one Doppler shifted version of the transmitted signal. Each mask is designed to correlate with $k$ selected Doppler-shifted versions of one transmitted signal. Since there are $n$ masks, a total of $kn$ Doppler shifted versions of $n$ signals can be detected by the use of the correlation technique described below.

When the ultrasonic light cell 105 contains the received but Doppler distorted signal, the intensity distribution of the light impinging on one of the optical masks 109–$i$ will correlate with the transmissivity distribution of one lengthwise region $j$ of the mask and a maximum of light will be transmitted through that region $j$ of the mask. The total light passing through each region of each mask is proportional to the integral of the product of the received signal and the transmitted signal represented by the transmissivity of that region of the mask. This light is continuously detected by light intensity detectors 110–1 through 110–$n$, and each light detector 110–$i$ is divided into $k$ lengthwise regions which correspond on a one-to-one basis with the $k$ regions of the corresponding mask 109–$i$. The light detected by the region $j$ of detector 110–$i$ is generally of a low intensity. However, when the intensity distribution of the zero order diffracted light correlates with the transmissivity distribution of region $j$ of mask 109–$i$, the corresponding region $j$ of light intensity detector 110–$i$ will emit a maximum signal which is amplified in amplifier 111–$i$, $j$ and then sent to the detecting circuit 112. Each region $j$ of light intensity detector 110–$i$ is followed by a corresponding amplifier 111–$i$, $j$. The signal from each amplifier 111–$i$, $j$ is sent to a combined detecting circuit and computation and display apparatus 112 which yields two pieces of information: the time at which the maximum light intensity was detected in detector 110–$i$, $j$, and the magnitude of the Doppler shift of the received waveform. The Doppler information is obtained merely by knowing the particular region $j$ of mask 109–$i$ which passed the maximum of light because the transmissivity of each region $j$ is designed to correlate with one Doppler shifted version of one transmitted signal. Threshold detecting and comptuation circuits appropriate for use with this invention are well known in the electronics art and will not be described in detail.

FIG. 2 shows a three dimensional view of one embodiment of the optical portion of the correlation system shown in FIG. 1$b$. In the collimated light source 104 light emitted from line source 104–$a$ is converted into collimated light by lens 104–$b$. The collimated light waves are passed through ultrasonic light cell 105 in a direction approximately perpendicular to the sides of the cell and approximately parallel to the wavefront of the compression waves passing through the cell. The ultrasonic light cell 105 is driven by the modulated ultrasonic carrier signal through the electrical-mechanical transducer 105–$a$.

The phase modulated and thus diffracted light waves which leave the light cell 105 are focused by lens 106 on the mask 107. The undiffracted light is focused on the transparent center 107–$a$ of the mask 107 while the diffracted light is focused on opaque regions of the mask. The undiffracted light which passes through the mask 107 is spread into $n$ different paths by diverging cylindrical lens 108. The undiffracted light patterns which are spread by lens 108 are then sent to $n$ different masks 109–1 through 109–$n$ each of which possesses $k$ vertical regions as shown in FIG. 6. As stated earlier, each region possesses a variable transmissivity as a function of some selected dimension designed to correlate with one particular Doppler shifted version of one transmitted signal. When the received signal correlates with the region $j$ from the mask 109–$i$ which corresponds to this signal, the region $j$ transmits maximum light and the corresponding section $j$ of light intensity detector 110–$i$ generates a maximum output signal. This output signal is amplified by corresponding amplifier 111–$i$, $j$ and the resulting signal is sent to the combination detecting and computing circuit to yield velocity and range information.

It should be mentioned that lens 106 and mask 107 shown in FIGS. 1$b$ and 2 are optional. If diverging cylindrical lens 108 is placed far enough away from the ultrasonic light cell 105, only the undiffracted light will impinge on lens 108 and the system will operate as described above but with decreased sensitivity. The use of lens 106 and mask 107 results in both an increase in sensitivity and decrease in physical dimensions of the system.

A second embodiment of this invention is shown in FIG. 3$a$. In the system shown in FIG. 3$a$ the received signal has been stored in the recirculating delay line of the deltic 301 in the form of samples which individually represent either the magnitude or polarity of the received signal at the time of sampling. The deltic sampling period P is usually much shorter than the duration T of the information bearing portion of the received signal.

The recirculating delay line of the deltic 301 is connected to a cathode ray tube 304, hereafter referred to as a "CRT," through an amplifier 302. The CRT 304 is driven by the sweep control 303 through one scan in the "Y" direction in slightly less than the time $P/(N+1)$ where $P/(N+1)$ is the time width occupied by each stored sample in the recirculating delay line in the deltic. The CRT's scanning beam is intensity modulated on each "Y" sweep by the amplitude or polarity of one sample stored in the deltic's recirculating delay line. As a result of this modulation, the intensity of each scan, as stored on the surface of the CRT, is proportional to the magnitude or polarity of the sample corresponding to the scan.

The operation of this apparatus will be made clear by the waveform diagrams shown in FIGS. 4a, 4b and 4c. If each transmitted signal consists of bi-level signals spread over a given duration T, each transmitted signal might be as shown in FIG. 4a. The received signal contains the transmitted but Doppler distorted signals, shown in FIG. 4b, in addition to normal background noise, which is not shown in FIG. 4b. The received signal shown in FIG. 4b has been expanded in time to illustrate signal expansion resulting from one form of Doppler distortion. Since the amount of Doppler distortion of a signal depends on the velocity of propagation of the signal relative to either the velocity of the reflecting object or relative to the difference in velocity between the source and receiver, as the case may be, Doppler distortion causes expansion or compression of the signal duration. For an example of this compression or expansion phenomenon, assume the receiver is moving away from the reflecting object or source. The leading edge of the transmitted pulse will be received by the receiver when the receiver is closer to the reflecting object or source than when the trailing edge of the same pulse is received. Thus the trailing edge of the pulse must travel a greater distance to the receiver than the leading edge, and the time taken to cover this greater distance is greater than the time taken by the leading edge of the pulse to reach the receiver. This time difference represents the time expansion of the transmitted pulse shown in FIG. 4b. Naturally this effect is usually greater with acoustic signals than with electromagnetic signals because of the relatively low propagation velocity of acoustic signals relative to most attainable velocities of sources and receivers or reflecting objects.

The received signal is sampled once each sampling period P but the samples are time compressed by the factor $N+1$ when stored in the deltic's recirculating delay line. The time compressed samples, separated by $P/(N+1)$ seconds, are shown in FIG. 4c. Thus the CRT's scanning beam makes one sweep in the "Y" direction in just under $P/(N+1)$ seconds. The remainder of the $P/(N+1)$ seconds is consumed by "flyback" time, the time required for the scanning beam to return to its starting position. Each sweep of the scanning beam leaves a line image on the surface of the CRT beside the earlier line images. This new line image has an intensity proportional to the magnitude or polarity of one sample of the received signal stored in the deltic. $(N+1)$ sweeps are made by the scanning beam in one sampling period P. The resulting light pattern on the surface of the CRT resembles parallel light and dark columns. The widths of the light and dark columns are functions of the amount of Doppler distortion undergone by the transmitted signal.

Figure 3B:
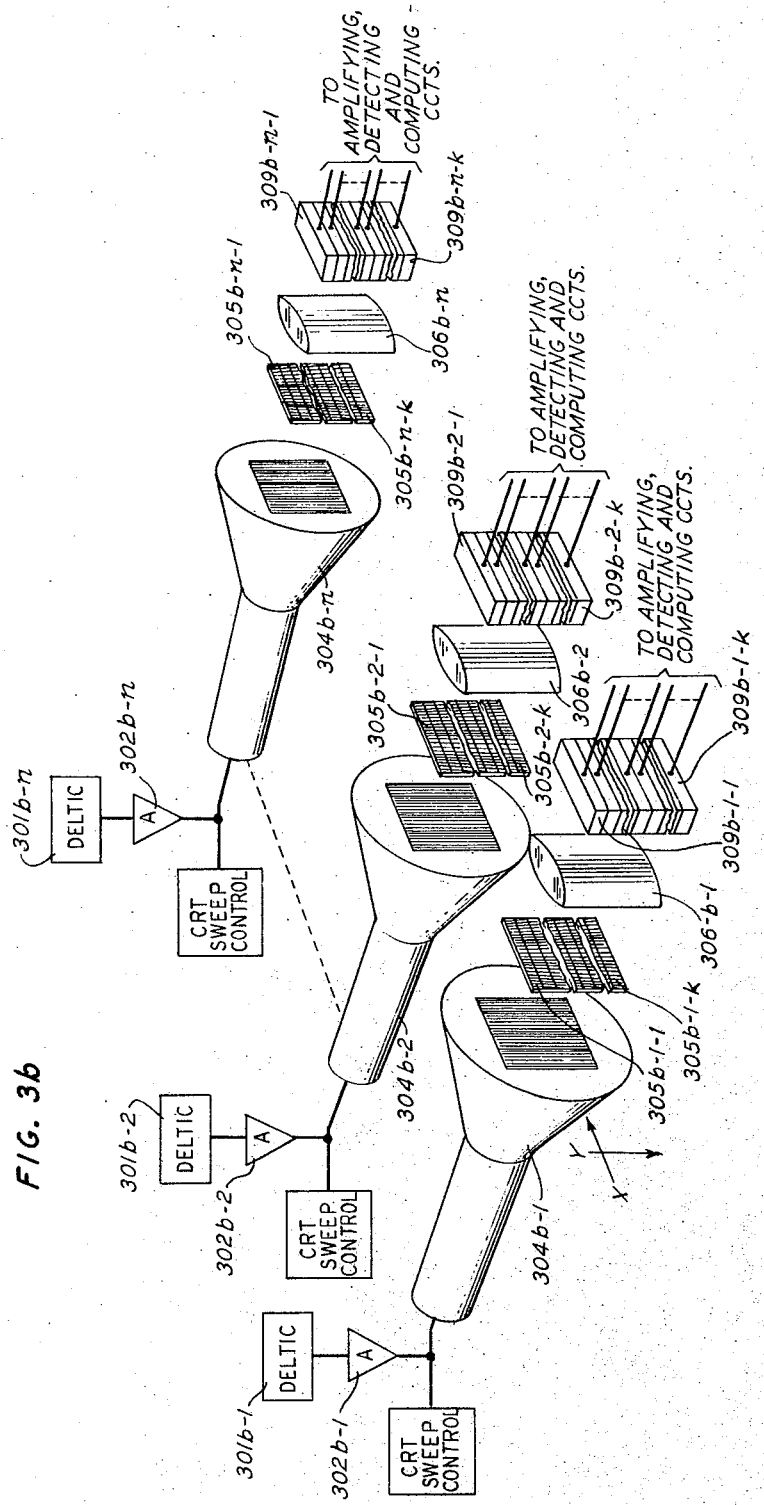
FIG. 3b is a three dimensional drawing of an embodiment of this invention utilizing a plurality of cathode ray tubes.

A series of optical masks 305–1 through 305–k shown in FIG. 3a as horizontal rectangular regions, are mounted side by side in parallel on the face of the CRT in the "Y" direction. Each optical mask is designed with variable transmissivity as a function of distance in the "X" direction. Each mask, denoted 305–j, is designed to pass a maximum of light when the transmitted signal has been subjected to a particular Doppler distortion. The light passed by masks 305 is focused by cylindrical focusing lens 306 on light intensity detectors 309–1 through 309–k which correspond on a one-to-one basis with the masks 305–1 through 305–k. When a transmitted but Doppler distorted signal is received, the mask 305–j which most closely correlates with the received signal passes a maximum of light. This light generates a maximum output signal from the corresponding light intensity detector 309–j. This output signal is sent to amplifying, detecting and computing circuits, for determination of both the Doppler shift of the received signal and the time of receipt of this signal. By using $n$ similar CRT's in parallel, as shown in FIG. 3b, the receipt of any one Doppler distorted signal out of $n$ possible transmitted signals can be recognized.

It is possible to modulate the width of the cathode ray beam on each "Y" scan in a linear fashion and at the same time rotate the resulting line on the face of the CRT so that each variable width, intensity modulated line is in contact with the two adjoining lines along its complete length. This configuration is shown in FIG. 3c. The amount of width modulation is scaled to be proportional to the expected range of Doppler distortion undergone by a transmitted signal. The midpoint of the "Y" scan is designed to correspond to zero Doppler distortion. A mask 305c with variable transmissivity in the "X" direction designed to correlate with the pattern generated by the undistorted transmitted signal is placed over the face of the CRT 304c. The transmissivity of the mask 305c is constant in the "Y" direction. If the narrowest part of the scanning beam occurs at the beginning of the scan and the widest part of the beam at the end of the scan, then a transmitted signal which has been expanded in time by Doppler distortion will match the mask 305c at some one value of $Y$ less than $Y/2$. A transmitted signal which has been compressed in time by Doppler distortion will match the mask 305c at some one value of $Y$ greater than $Y/2$. The value of $Y$ at which a maximum light intensity is transmitted through the mask 305c is determined by light intensity detector 309c–j located opposite this portion $j$ of the mask 305c. The signals from light intensity detecting circuits 309c are sent to amplifying, detecting and computing circuits. Placed between the mask 305c and the light intensity detectors 309c is a suitable focusing lens 306c.

Other methods of optically compressing or expanding the received signal to compensate for the Doppler distortion of the transmitted signal are possible. For example, as shown in FIG. 5, it is possible to compress or expand optically the diffracted and undiffracted light which has passed through the ultrasonic light cell by passing this light through optical wedges or lenses 508–1 through 508–k, where k is an integer. In this configuration, only one mask, 509, divided into $n$ regions, is needed. Each region $i$ of mask 509 corresponds to one possible transmitted signal where $i$ and $n$ are integers and $1 \leq i \leq n$. The particular wedge 508–j which focuses the diffracted light in such a manner as to cause a maximum signal from a light intensity detector 510–i behind the region $i$ of mask 509 yields the Doppler shift of the received waveform.

In FIG. 5 light from line source 504 passes through lens 504–a where it is collimated. The parallel light passes through ultrasonic light cell 505 where it is modulated and thus diffracted by the compression and rarefaction waves in the light cell's material. The diffracted light, upon emerging from light cell 505 passes through lens 508–j which either expands, contracts or leaves unaltered the diffracted light from light cell 505. Lens 508–j is attached to disk 508 which is rotated periodically by drive motor 511. Lens 508–j is placed between the light cell 505 and focusing lens 506 for the time period necessary for the samples stored in the deltic's recirculating delay line to make one complete cycle, which is just $P-P/(N+1)$ seconds. Drive motor 511 then rotates the disk by $2\pi/k$ radians where $k$ is the number of expanding or contracting lenses 508–1 through 508–k on disk 508. This rotation can take up to one sampling period P or more depending on the combined inertia of the rotating disk 508 and drive mechanism associated with drive motor 511. The number of lenses $k$ which can be placed on disk 508 is limited by the Doppler resolution desired and the dimensions of the disk. In the limit, one annular shaped lens with continuously varying characteristics could be used.

By way of example, if 100 lenses are placed around the rim of disk 508 and if two sampling periods are consumed for the analysis of the received signal by each lens, then 200 sampling periods P will be used for the analysis of the received signal by all 100 lenses. If P is $10^{-3}$ seconds, for example, then 200 milliseconds are required to analyze the received signal over the range of expected Doppler variations. During this time, the samples from the received signal will be updated by 200 milliseconds. That is, the oldest 200 samples in the recirculating delay line will be sequentially eliminated by the addition of 200 new samples as obtained from the received signal.

Lenses 508 are designed to expand or contract the light from cell 505. However, the light leaves lenses 508 possessing the same angle of incidence with which it entered. Light which passes lens 508–$j$ is focused by lens 506 on a selected point of mask 507. This mask is preferably designed to pass only the undiffracted or zero order diffracted light from ultrasonic light cell 505 and to block the passage of the other orders of diffracted light from the same cell. Of course if desired, this mask could pass any other order of diffracted light. The light which passes mask 507 impinges on mask 509, each region $i$ of which has a variable transmissivity along its long dimension to correlate with the expected light pattern generated by one undistorted transmitted signal.

If the received signal stored in cell 505 is distorted, this distortion will be compensated for or corrected by contracting or expanding the light which passes through the cell 505 in one of the correction lenses 508–$j$. If the received signal has been contracted by the approach of either the source and receiver or of a reflecting object and the receiver, the light rays from cell 505 must be expanded. If the received signal has been expanded by the retreat of the source relative to the receiver or of a reflecting object relative to the receiver, the light rays from cell 505 must be contracted. The lens 508–$j$ which results in a maximum light passing through region $i$ of mask 509 is indicated by a maximum output signal from a corresponding light intensity detector 510–$i$. This maximum output signal is amplified and sent to a threshold detecting and computing circuit where the reflecting object's range and velocity are determined.

Other methods of optically correcting for the Doppler distortion of the reflected acoustical waveform according to the principles of this invention will be obvious to those skilled in the art. In particular the principles of this invention can be applied in signal reception systems utilizing those parts of the electromagnetic energy spectrum, both visible and invisible, which are amenable to optical processing.

What is claimed is:

1. Apparatus for recognizing in an incoming signal both one of a plurality of information bearing signals which has been subjected to Doppler distortion, and the amount of Doppler distortion of this signal, which comprises means for presenting said incoming signal as an optical signal, a plurality of masks corresponding on a one-to-one basis with said plurality of information bearing signals, wherein each mask possesses a plurality of transparent regions, and wherein the transmissivity of each of said transparent regions correlates with a corresponding Doppler distorted version of said information bearing signal corresponding to said mask, means for simultaneously directing said optical signal through all regions of said plurality of masks, so that a maximum of optical signal energy is transmitted through the region of the mask which best correlates with said incoming signal, and means for determining both the particular information bearing signal transmitted, and the amount of Doppler distortion of this signal, by detecting the region of the mask which passes maximum signal energy.

2. Apparatus for recognizing in an incoming signal both a doppler distorted version of a transmitted signal and the amount of said Doppler distortion, which comprises means for presenting a segment of said incoming signal as a pattern on a material radiating optical energy, said pattern possessing a width proportional to the length of said segment, and said width varying linearly in a selected direction, the range of said width variation being proportional to the expected range of Doppler distortion of said transmitted signal, a plurality of masks wherein all masks possess transmissivity variations in a direction perpendicular to said selected direction, said transmissivity variations corresponding to the amplitude variations with time of a selected transmitted signal, and said masks being arranged relative to said presenting means so that the energy radiated in the form of said pattern by said material passes simultaneously through all of said masks, and means for determining both the receipt and the magnitude of the Doppler distortion of said transmitted signal by detecting that mask which passes maximum energy.

3. Optical correlation apparatus which comprises means for generating collimated light, means for modulating said collimated light with an incoming signal containing one of a set of $n$ possible signals thereby to produce diffracted light containing zero through $p$ diffraction orders, where $n$ is a positive integer equal to or greater than unity, and $p$ is a positive integer greater than unity, means for removing from said modulated, collimated light all orders of diffracted light except the $m^{\text{th}}$ order, where $m$ is a selected integer with a value limited by the relation $0 \leq m \leq p$, means for simultaneously sending said selected $m^{\text{th}}$ order diffracted light into a plurality of $n$ paths each corresponding to one of said $n$ possible signals, and means for detecting both the receipt and the amount of Doppler distortion of any one of said $n$ possible signals, said detecting means including, a plurality of $n$ variable transmissivity means placed on a one-to-one basis in said plurality of $n$ paths, wherein each variable transmissivity means correlates with $k$ selected Doppler distorted versions of a corresponding one of said $n$ possible signals by possessing $k$ regions each possessing a transmissivity as a function of length which correlates with the intensity of said $m^{\text{th}}$ order diffracted light corresponding to one Doppler distorted version of the corresponding possible signal, where $k$ is a positive integer, and a plurality of $nk$ light intensity detecting means which correspond on a one-to-one basis to said $nk$ regions of said plurality of $n$ variable transmissivity means, and which detect the intensity of said $m^{\text{th}}$ order light so that at the time the intensity of said diffracted light generated from said incoming signal correlates with the transmissivity of one of said $nk$ regions, said corresponding light intensity detecting means emits a maximum signal.

4. Optical correlation apparatus for recognizing in an incoming signal a time expanded or time compressed version of a transmitted signal which comprises means for generating collimated light, means for modulating said collimated light with said incoming signal, thereby to produce diffracted light containing zero through $p$ diffraction orders, where $p$ is a positive integer, means for spatially compressing or expanding said diffracted light to compensate for the time expansion or compression respectively of said transmitted signal, means for removing from said compressed or expanded diffracted light all diffracted light except the $m^{th}$ order diffracted light where $m$ is an integer limited by the relation $0 \leq m \leq p$, masking means placed in the path of said remaining $m^{th}$ order diffracted light, wherein said masking means possesses a plurality of regions with variable transmissivity as function of length one of which correlates with said $m^{th}$ order diffracted light generated from said incoming signal at the time said incoming signal contains said transmitted signal, and means for indicating which region of said masking means passes maximum light and the time of said maximum light passage.

5. Apparatus as claimed in claim 4 wherein said means for spatially compressing or expanding said diffracted light to compensate for the time expansion or compression respectively of said transmitted signal comprises a plurality of lenses mounted on a rotatable disk, wherein each of said lenses is designed to expand or contract said diffracted light by a specified amount thereby to compensate for one value of time contraction or time expansion of the transmitted signal, and driving means for rotating said disk.

6. Apparatus as claimed in claim 4 wherein $m$ equals zero.

7. A system for recognizing in an incoming signal a transmitted but Doppler distorted signal derived from a known population of $n$ signals, where $n$ is a positive integer, which comprises means for sampling at a selected frequency said incoming signal to obtain a plurality of samples, means for storing the N newest samples of the incoming signal where N is a positive integer, means for generating an ultrasonic carrier signal, means for modulating said ultrasonic carrier signal with said stored samples, means for generating compression and rarefaction waves in an ultrasonic light cell from said modulated ultrasonic carrier signal, a source of collimated light positioned relative to said ultrasonic light cell so that said collimated light passes through said ultrasonic light cell in a direction approximately perpendicular to the direction of travel of said compression and rarefaction waves in said ultrasonic light cell and approximately parallel to their wavefronts, thereby to diffract said collimated light into zero through $p$ diffraction orders wherein each diffraction order possesses an intensity as a function of a selected spatial dimension determined by a selected characteristic of said incoming signal, where $p$ is a positive integer, means in optical relation with said ultrasonic light cell for allowing the passage of a selected one of said diffraction orders, means for simultaneously diverging said selected diffraction order into $n$ separate paths, and means for detecting both the receipt and the amount of Doppler distortion of said transmitted but Doppler distorted signal, said detecting means including, $n$ optical correlation means placed on a one-to-one basis in said $n$ paths wherein each of said $n$ optical correlation means possesses $k$ areas of selected transmissivity as a function of length, and wherein each area of each of said $n$ optical correlation means is designed to allow the passage of a maximum of light when the incoming signal generates diffracted light with an intensity distribution which correlates with the transmissivity of that area, where $k$ is a positive integer, and means for indicating the area of the particular optical correlation means which passes a maximum of light.

8. Apparatus as claimed in claim 7 wherein said means for allowing the passage of a selected one of said diffraction orders comprises a mask possessing one selected transparent region, and a cylindrical focusing lens mounted in optical relation to both said ultrasonic light cell and said mask in order to focus said selected order of diffracted light on said transparent area of said mask so as to allow the passage through said mask of only said selected diffracted light.

9. Apparatus as claimed in claim 7 wherein said means for diverging said selected diffraction order into $n$ separate paths comprises a cylindrical diverging lens.

10. Apparatus as claimed in claim 7 wherein said plurality of $n$ optical correlation means comprises $n$ masks each composed of $k$ sections of variable transmissivity as a function of length, wherein each section is designed to pass a maximum of light when a transmitted but distorted signal correlates with the transmissivity of that section as a function of length, and wherein each of said $n$ masks is designed to correlate with one of said population of $n$ signals, and said plurality of indicating means comprises a plurality of $nk$ light intensity detectors, each light intensity detector corresponding to one section $j$ of a selected mask $i$, where $j$ and $i$ are positive integers defined by the relations $1 \leq j \leq k$ and $1 \leq i \leq n$.

References Cited

UNITED STATES PATENTS

| 2,958,039 | 10/1960 | Anderson | 324—77 |
| 3,088,113 | 4/1963 | Rosenthal | 343—100.7 |
| 3,157,874 | 11/1964 | Altar et al. | 343—100.7 |
| 3,204,248 | 8/1965 | Alexander | 235—181 |

RICHARD A. FARLEY, *Primary Examiner.*

RODNEY D. BENNETT, *Examiner.*

C. L. WHITHAM, *Assistant Examiner.*